Dec. 16, 1958    A. R. BUCHHOLZ ET AL    2,864,385
COIN DISPENSING MACHINE

Filed Dec. 23, 1954    9 Sheets-Sheet 1

INVENTORS
Arnold R. Buchholz
William H. Sprenger
BY
Charles & French
Attys.

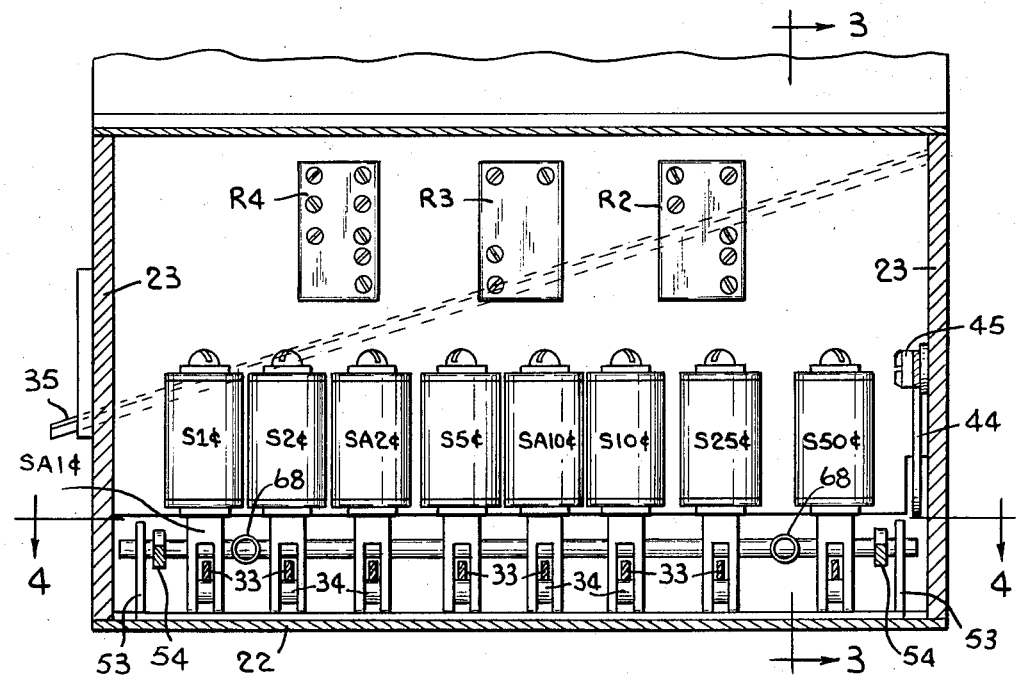
Fig. 2
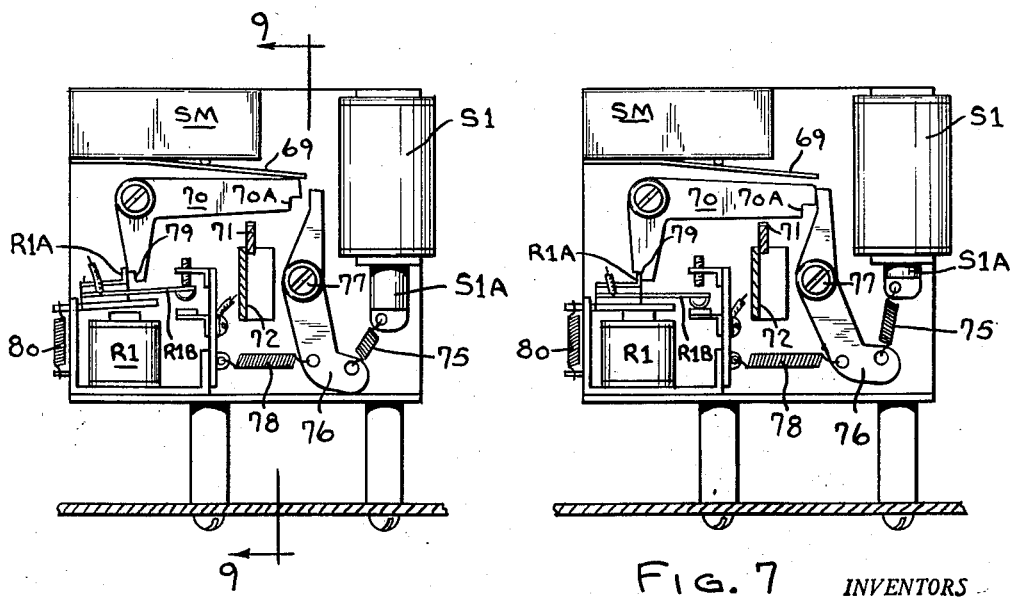
Fig. 6
Fig. 7
INVENTORS
Arnold R. Buchholz
William H. Sprengle
BY Charles & French
Attys.

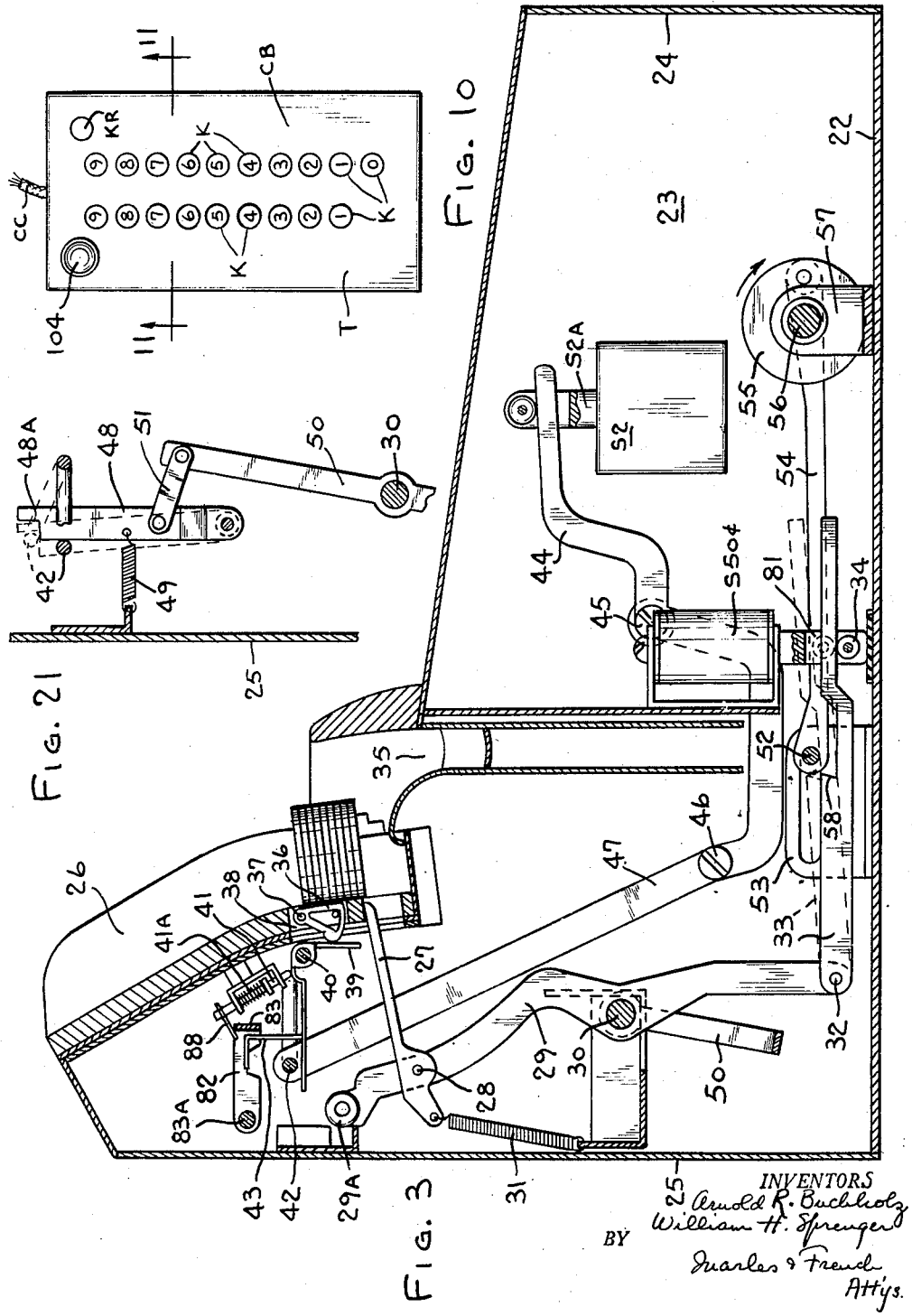

Dec. 16, 1958 A. R. BUCHHOLZ ET AL 2,864,385
COIN DISPENSING MACHINE
Filed Dec. 23, 1954 9 Sheets-Sheet 4

INVENTORS
Arnold R. Buchholz
William H. Sprague
BY
Charles & French
Att'ys.

Dec. 16, 1958 A. R. BUCHHOLZ ET AL 2,864,385
COIN DISPENSING MACHINE
Filed Dec. 23, 1954 9 Sheets-Sheet 5

INVENTORS
Arnold R. Buchholz
William H. Sprenger
BY
Quarles & French
Att'ys.

Dec. 16, 1958     A. R. BUCHHOLZ ET AL     2,864,385
COIN DISPENSING MACHINE
Filed Dec. 23, 1954     9 Sheets-Sheet 6

INVENTORS
Arnold R. Buchholz
William H. Sprenger
BY
Quarles & French
Attys.

INVENTORS
Arnold R. Buchholz
William H. Sprenger
BY
Quarles & French
Attys.

United States Patent Office 2,864,385
Patented Dec. 16, 1958

2,864,385

COIN DISPENSING MACHINE

Arnold R. Buchholz and William H. Sprenger, Watertown, Wis., assignors to Brandt Automatic Cashier Company, Watertown, Wis., a corporation of Wisconsin Application December 23, 1954, Serial No. 477,154

5 Claims. (Cl. 133—2)

The invention relates to coin dispensing machines.

The usual coin dispensing machines incorporate a keyboard as an integral part of the machine to control the ejector mechanisms used in dispensing the coins, which means that the machine must be located on a counter or other support within reach of the operator. The main object of the present invention is to provide a coin dispensing apparatus in which the operator controlled keyboard is separate from the machine and electrically connected thereto so that the machine may be disposed in any convenient location above or below the operator's counter and the coins can be delivered to the operator through any suitable transporting system such as a conveyor chute.

A further object of the invention is to provide a coin dispensing machine with an electrically controlled keyboard in which the parts are so related that only a minimum number of coins are dispensed for any particular transaction. While the machine herein shown is particularly designed to act as a coin payor, parts of the mechanism may also be incorporated in other forms of coin dispensing machines such as coin changers so that the invention is not to be limited to a coin payor type of machine unless so specified.

The invention further consists in the several features hereinafter described and more particularly defined by claims at the conclusion hereof.

In the drawings:

Fig. 2 is a vertical sectional view taken on the line 2—2 of Fig. 1;

Fig. 3 is a vertical sectional view taken on the line 3—3 of Fig. 2;

Fig. 6 is a vertical detailed fragmentary section taken on the line 6—6 of Fig. 1 showing the parts in normal position;

Fig. 7 is a view similar to Fig. 6, showing the parts in one position during operation;

Fig. 10 is a top plan view of the control box;

Fig. 21 is a vertical sectional view taken on line 21—21 of Fig. 5.

Figure 1:
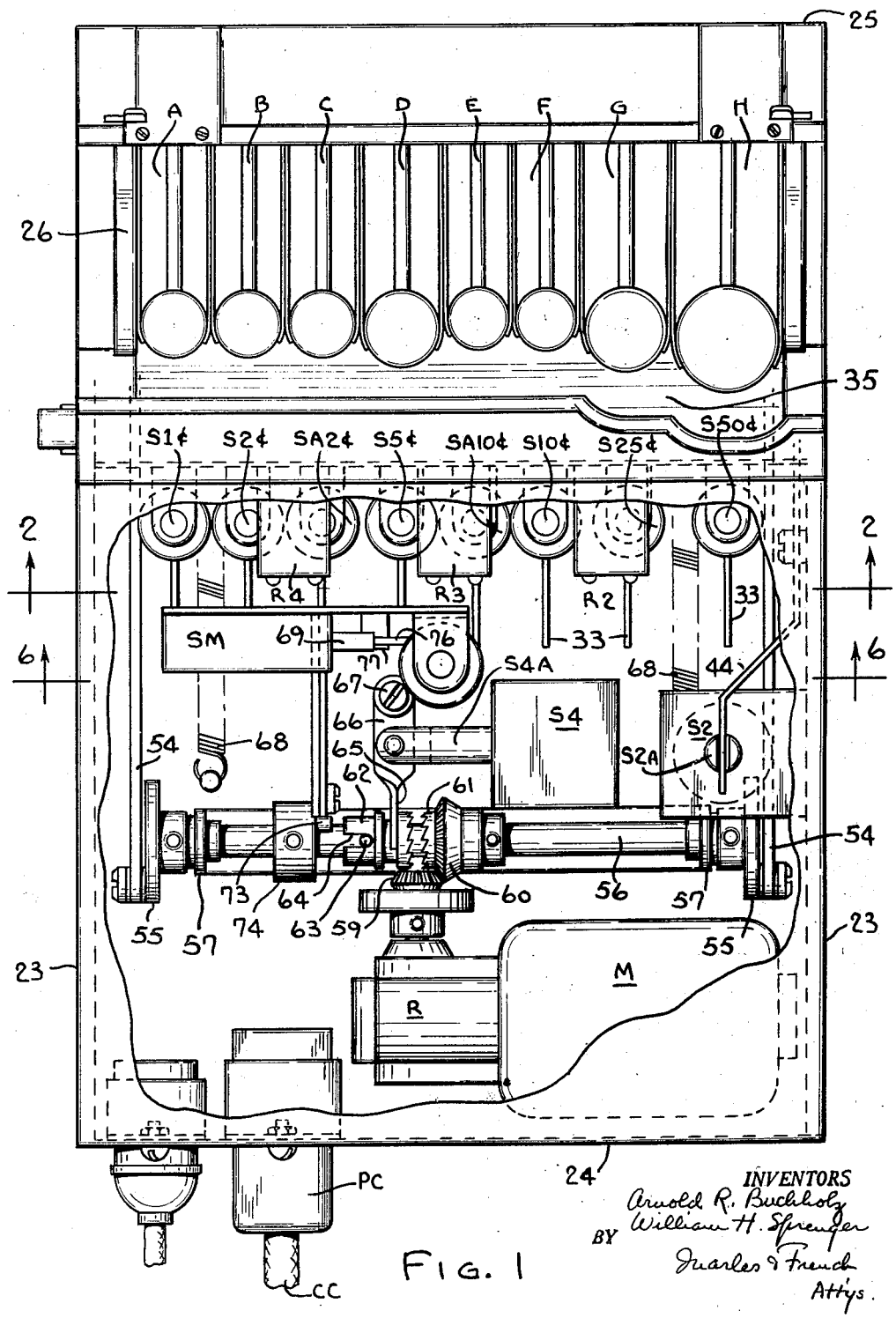
Fig. 1 is a plan view of the coin dispensing apparatus with parts broken away.
Figure 4:
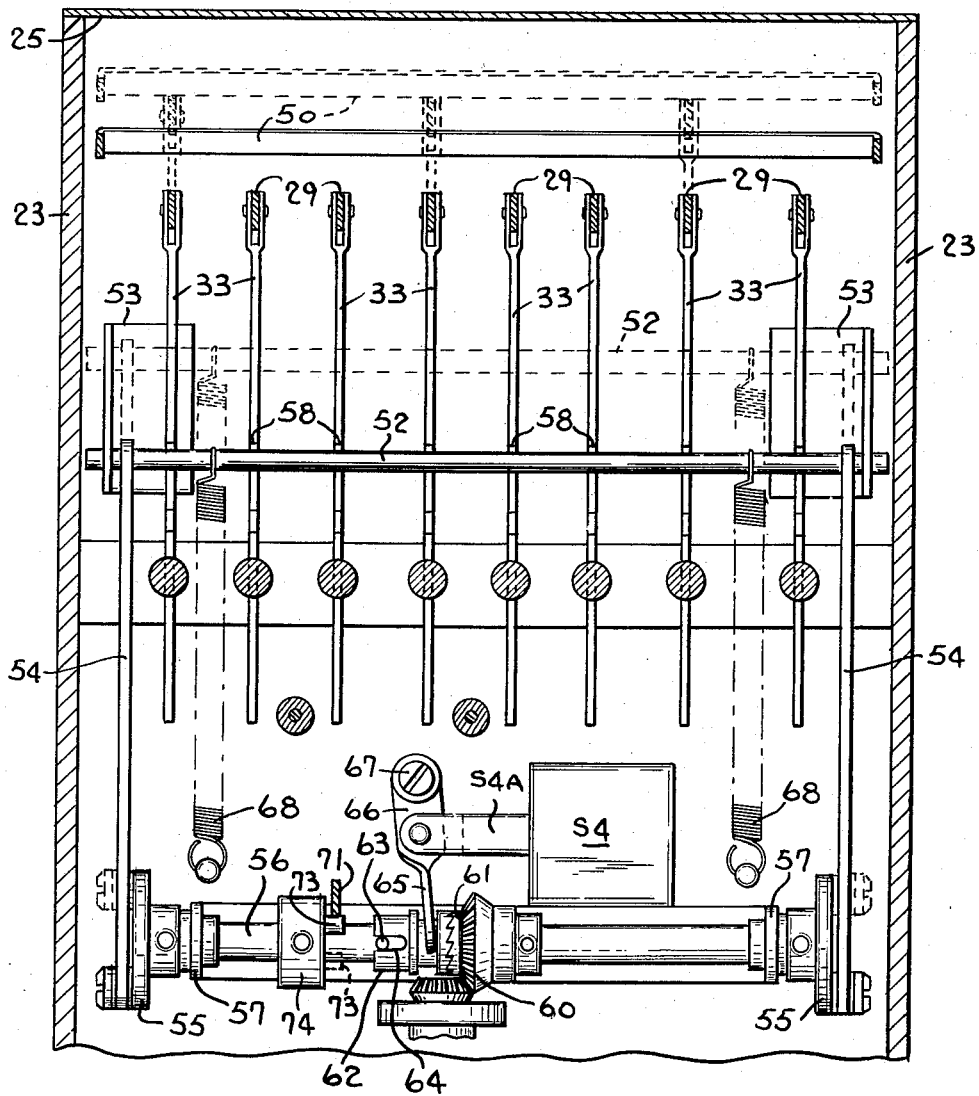
Fig. 4 is a horizontal sectional view taken on the line 4—4 of Fig. 2.

Referring to Figs. 1 and 3, the apparatus includes a metal housing having a base 22, sides 23, front 24, and removable back plate 25. A coin tray 26 is suitably removably mounted at the back end of the housing and is formed to provide coin compartments or chutes for the various denominations of coins. The chutes A, B, and C carry pennies in stacks, the chute D carries nickels, the chutes E and F dimes, the chute G quarters, and the chute H half dollars. The ejector mechanism for the chute A is adapted to eject one penny at a time therefrom, and the ejector mechanisms for the chutes B and C are adapted to eject two pennies each at a time, so that either one penny, two pennies, three pennies, or four pennies can be dispensed from the machine. The ejector mechanism for the chutes E and F are each adapted to eject one dime at a time while the ejectors for chutes D, G, and H are adapted to eject one coin at a time from each of said chutes.

The ejectors each include a coin ejector finger 27 working through a slot in the coin tray and pivotally connected at 28 to the upper arm of an ejector lever 29 pivotally mounted intermediate its ends on a transversely extending shaft 30, said finger 27 being normally urged upwardly by a spring 31 against the upper side of said slot. The lower arm of lever 29 is pivotally connected at 32 to the outer end of a push bar 33 whose front end slides on a guide roller 34. Movement of the push bar 33 to the left by actuating mechanism hereinafter described swings lever 29 and with it the finger 27 to move said finger toward the right as viewed in Fig. 3 to eject the coin from its chute so that it may fall into a chute structure 35 by which it is carried out of the apparatus.

A coin engaging finger or lever 36 is pivotally mounted at its upper end 37 to work in an upper slot 38 in each chute of the tray. Each finger 36 is yieldingly held against the stack of coins by a bell crank locking lever 39 pivotally mounted on a transversely extending shaft 40 and yieldingly urged into engagement with its finger by a spring urged plunger 41. If then the coins in a chute become depleted to an extent which permits the finger 36 to swing out into the chute, the plunger 41 acting on the back arm of lever 39 swings the same downwardly into the path of the roller 29A on lever 29 and prevents this lever from moving the ejector finger 27 to eject a coin. To permit the machine to pay out one or more coins from the depleted chute, means are provided to temporarily swing the lever 39 out of the path of the lever 29 and relieve the pressure of the plunger 41 on lever 39 to permit a single dispensing operation comprising a pressure release bar 42 extending across the machine above one set of the arms of said levers 39 and having bent ends pivotally mounted in the sides of the housing and adapted to be swung upwardly into engagement with an angled finger 43 on the back arm of the lever 39 then in a lock position and swing said lever back to its normal position shown in Fig. 3 to relieve the pressure of the plunger 41 on said lever 39 and permit the finger 36 to swing back so that coins left in the associated chute section may descend to a position where one or more of them may be pushed out of the coin tray by their respective ejector member. The movement of the pressure bar 42 is effected by an operator controlled solenoid S2 whose plunger S2A engages one end of a lever 44 pivoted at 45 adjacent one side of the machine and having its other end pivotally connected at 46 to one end of a link 47 whose other end is pivotally connected to the bar 42.

A latch lever 48 is pivotally mounted at one end on the housing and has a notch 48A to engage and hold the release bar 42 in its latched position, said lever being moved to its latching position by a spring 49. As the ejector mechanism completes its operation, the latch lever 48 is released from the bar 42 by the engagement of the ejector lever 29 with the lower end of a latch release lever 50 pivoted on the shaft 30 and operatively connected at its upper end by a link 51 with an intermediate portion of the lever 48 so that only one operation is permitted the ejector mechanism before it is again locked against actuation.

The actuating mechanism for operating all or any one of the push bars 33 comprises a transversely disposed bar 52 mounted at its ends in slotted guide brackets 53 and pivotally connected adjacent said ends to one end of a pair of connecting rods 54 whose other ends are pivotally connected to crank disks 55 mounted on the ends of a drive shaft 56 journalled in the arms of a bracket 57. A single or partial rotation of the shaft 56 acting through disks 55 and rods 54 causes the bar 52 to move from its full line position shown in Fig. 3 toward the left, and if the hooked portion 58 of any one of the push bars 33 is then in its dotted line or raised position, it will be engaged by said bar 52 and be moved toward the left and thus actuate the lever 29 and the ejector finger 27 associated therewith as previously described.

For turning the shaft 56 we show an electric motor M having a speed reducer R whose output shaft carries a bevel gear 59 that meshes with a bevel gear 60, loose on the shaft 56, and whose hub has a toothed clutch face 61 adapted to be engaged by the toothed face of a clutch sleeve 62 slidably keyed by key 63 and slot 64 to the shaft 56. Sleeve 62 has an annular groove engaged by the forked end 65 of a shift lever 66 pivoted on the housing at 67 and pivotally connected intermediate its ends to the plunger S4A of a solenoid S4. With the motor running, the operation of the solenoid S4 acts to move the sleeve 62 into engagement with the cooperative clutch member 61 to rotate said shaft 56 in a direction to operate the ejectors, and before a single revolution of shaft 56 has been made, the solenoid S4 has been cut out so that the sleeve 62 is free to move out of clutching engagement with member 61 and declutching is effected by springs 68 anchored at one end to the housing and at their other ends to the bar 52 which are put under load on the ejecting movement of said bar and then react through said bar, rods 54, and disks 55 to turn the shaft 56 in the same direction as that of the motor M but at a higher speed so the clutch elements above described are released from or overrun relative to each other.

Figure 8:
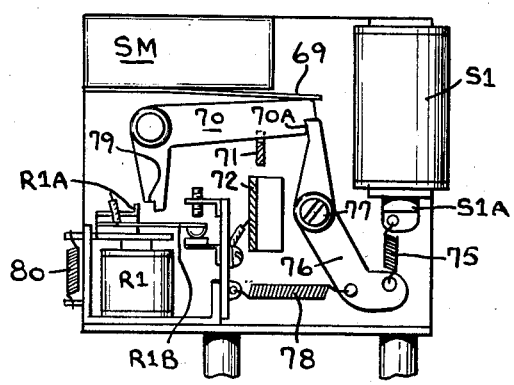
Fig. 8 is a view similar to Fig. 6 showing the parts in another position during operation.
Figure 9:
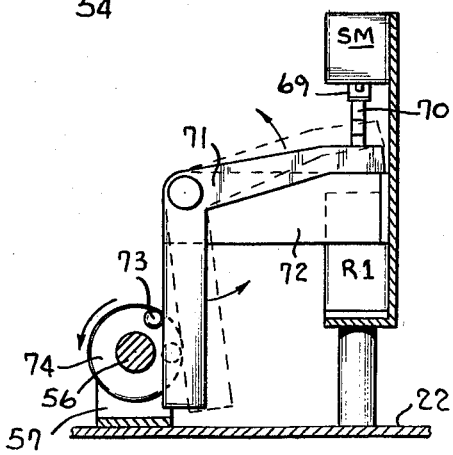
Fig. 9 is a vertical sectional view taken along the line 9—9 of Fig. 6.
Figure 11:
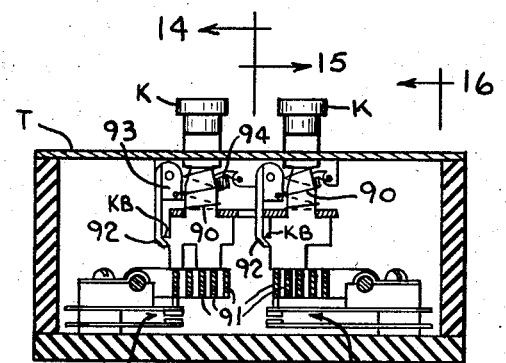
Fig. 11 is a vertical sectional view taken on the line 11—11 of Fig. 10.
Figure 17:
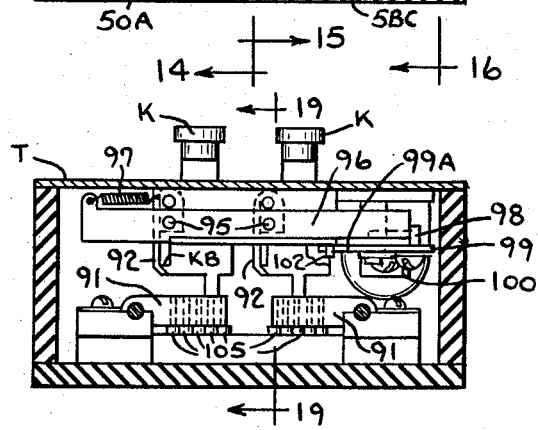
Fig. 17 is a vertical sectional view taken on the line 17—17 of Fig. 14.
Figure 18:
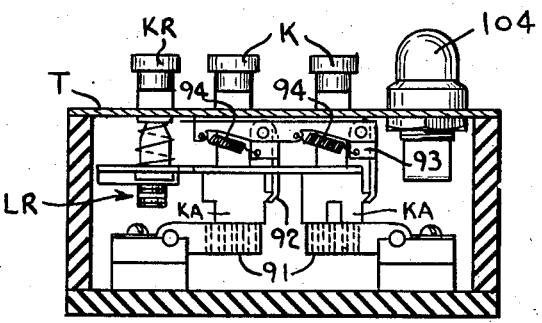
Fig. 18 is a vertical sectional view taken on the line 18—18 of Fig. 14.

The motor M and clutch solenoid S4 are in a circuit controlled by a double throw switch SM (Figs. 6, 7, and 8) normally biased to a closed position and having an actuating spring arm 69 engageable with a bell crank lever 70 pivotally supported beneath it and which, as shown in Fig. 9, is adapted to be engaged by one arm of a bell crank lever 71 pivotally supported on a bracket 72 and whose other arm is in the path of movement of a crank pin 73 on a disk 74 secured to the shaft 56. The switch SM is not opened until the shaft 56 on being revolved by the motor M brings the pin 73 to the dotted line position shown in Fig. 9 and at the same time the clutch solenoid S4 is deenergized so that the springs 68 can react to disengage the clutch.

To insure the holding in of the lever 70, the plunger S1A of a holding solenoid S1 is connected by a spring 75 to one arm of a locking or latch lever 76 pivotally mounted at 77 and engageable through its other arm with a notch 70A in one arm of the lever 70, a spring 78 acting to release said latch 76.

The other arm of the lever 70 is provided with a notch 79 adapted to engage a latch R1A on switch arm R1B of a relay R1 to hold said arm in one of its positions as shown in Fig. 7, said arm R1B being suitably pivotally mounted and biased to the other of its circuit closing positions by a spring 80.

Figure 20:
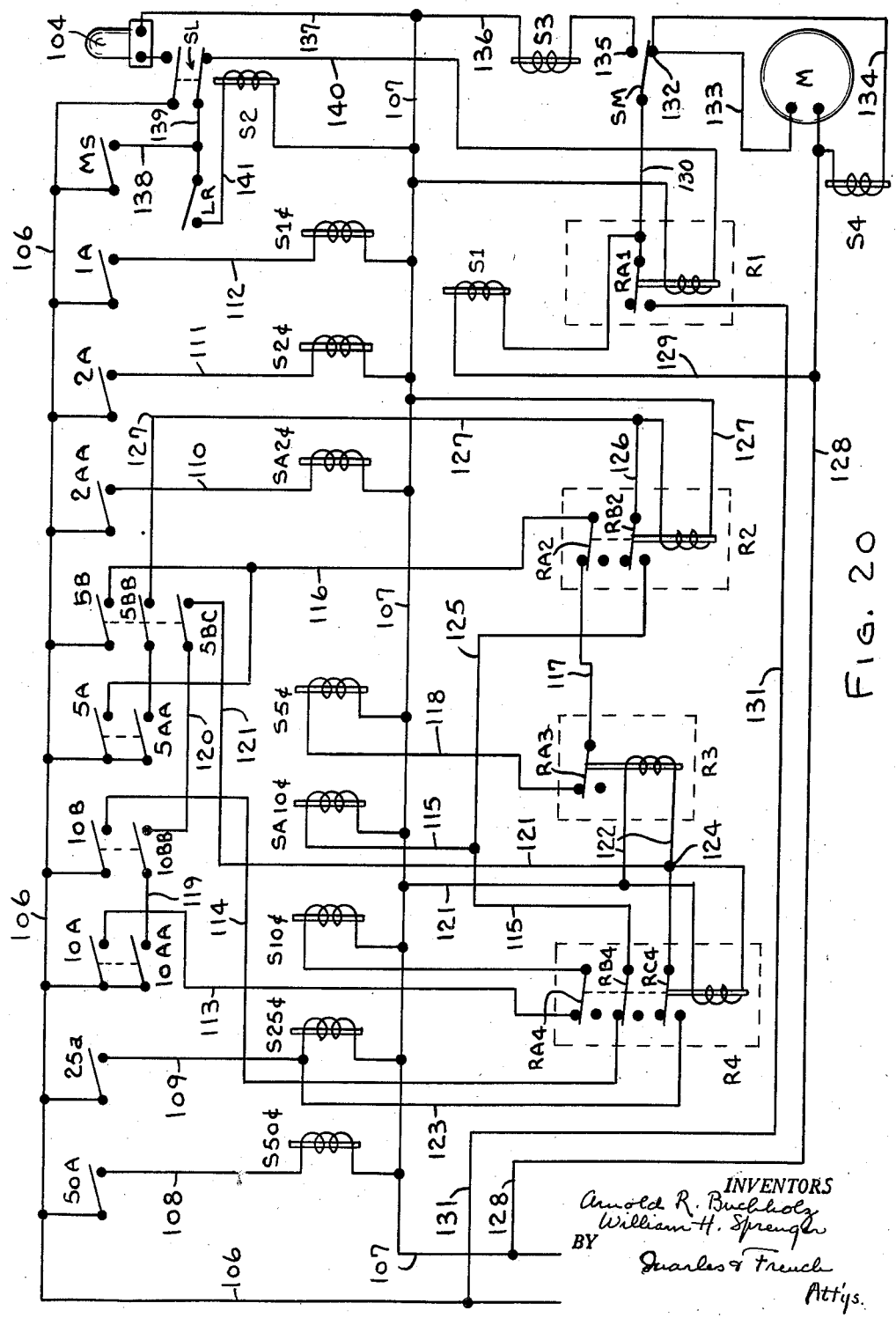
Fig. 20 is a wiring diagram of the apparatus.

For selectively bringing any one of the push bars 33 into position to be actuated, the roller 34, heretofore mentioned, is mounted in the slotted end 81 of a plunger for a solenoid, which in Fig. 20 have been designated by the denomination of coin which is dispensed as S50¢, S25¢, S10¢, SA10¢, S5¢, S2¢, SA2¢, and S1¢. In Fig. 3 the solenoid S50¢ has been shown, and when energized, raises its plunger and with it the free end of the bar 33 so that its hook 58 will be in the path of the actuating bar 52 as it moves on its coin ejecting stroke.

Figure 5:
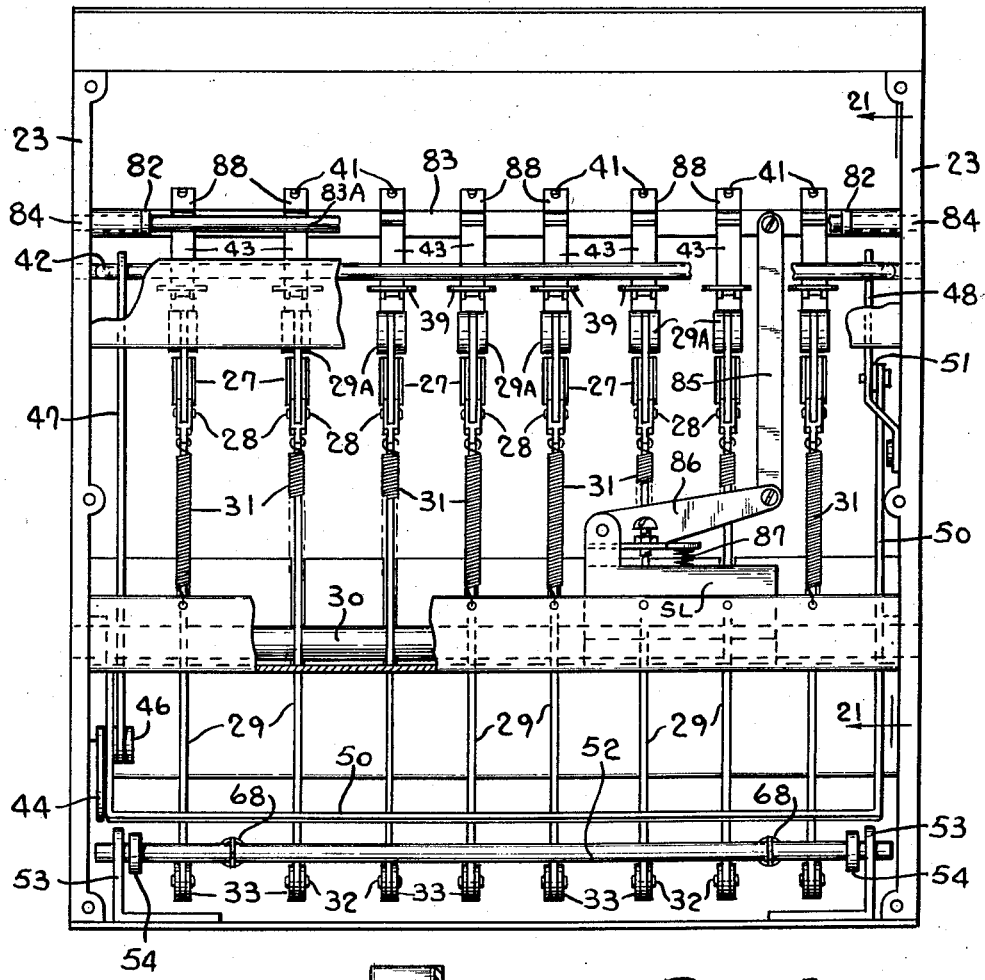
Fig. 5 is a rear elevation view of the apparatus with the back cover removed.

Referring to Figs. 3, 5, and 20, whenever the coins in any one of the chutes as previously described have become depleted and the pressure release bar 42 is raised, in raising it strikes the arms 82 of a U-shaped lever 83 whose legs are mounted on a shaft 83A pivoted on the housing at 84 and lifts this lever up carrying with it a link 85 operatively connected to a pivoted control lever 86 for a double throw switch SL to permit said switch to move from the position shown in Fig. 20. A spring 87 normally acting on the lever 86 keeps the lever 83 in a position where it is stopped by engagement with one or more stop fingers 88 that are each respectively carried by the plungers 41, whose springs 41A are stronger than the spring 87. When the lever 83 is raised, its transverse portion acts on the fingers 88 to move the plungers 41 against the pressure of their springs 41A so that the spring 87 continues to act on the lever 86 to hold the switch SL in its normal position. When, however, on a release of the latch 48 the release bar 42 drops down to its normal position, the spring 41a of the plunger 41 associated with the depleted coin chute then acts through its associated finger 88 on the lever 83 and moves it, its link 85, and control lever 86 against the pressure of the spring 87 to throw the switch SL to its "motor off" position.

Relays R4, R3, and R2 are mounted in the housing. All of the solenoids, relays, and switches previously mentioned have their current supply wires enclosed in a cable CC which has a plug in connection PC with the circuit wires in the housing and which cable connects with control switches in a control box CB. The current supply wires have a suitable plug in connection with a source of current supply and connect with circuit conductors hereinafter described.

Referring to Figs. 10 to 18, the control box CB has a removable top T in which a series of operator controlled keys K are vertically slidably mounted, each key being retained in its upper position by a spring 90. Each key K has a specially formed foot or finger KA with one or more projections adapted when depressed to engage and press down on one or more of a series of levers 91 which act to close one or more switches hereinafter described. As shown in Fig. 10, the keys K are arranged in two rows, the first having tens keys numbered 1 to 9 and the second having digit keys 1 to 9 and 0 key. Each key K has a locking notch KB so that when any key is depressed, it may be engaged and held down by a latch finger 92 on a pivoted latch bar 93 for one row of keys. Each latch bar 93 is normally urged to a latching position by a spring 94, and both of these bars 93 are operatively connected intermediate their ends by screws 95 to a latch release bar 96 which under the action of a spring 97 has thrust connection with a pin 98 on a crank member 99 pivoted on the cover at 100 and operatively connected by a link 101 with the plunger S3A of a key release solenoid S3, said crank having a stop arm 99A engageable with a stop pin 102 in the released position of the latch bars 93. It is to be noted that when any key in any row is depressed and latched, that pressing down of another key in the same row will release the latched key.

A spring released lock release key KR is mounted on the cover and its foot (see Fig. 16) is adapted to engage the movable contact member 103 of a lock release switch LR which as hereinafter described controls the solenoid S3. A coin depletion signal lamp 104 is also mounted on the cover.

Figure 12:
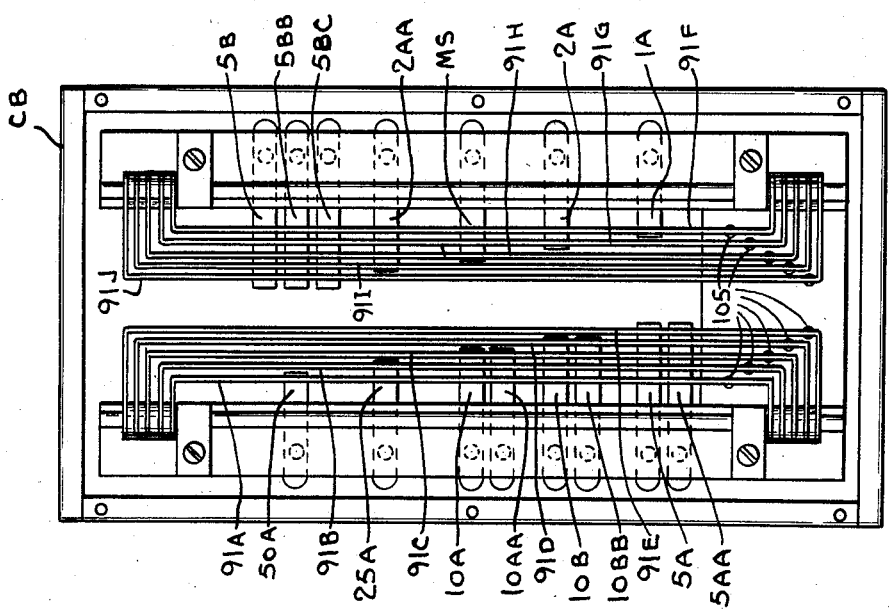
Fig. 12 is a plan view of the control box with the top cover removed.
Figure 14:
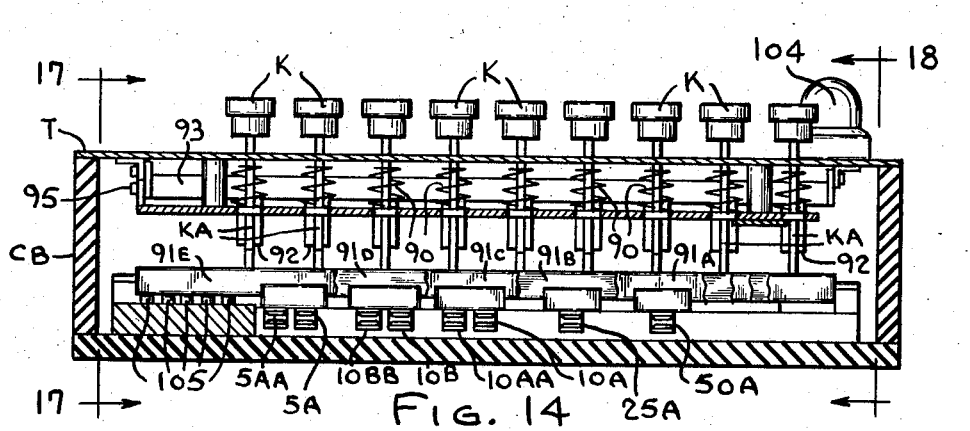
Fig. 14 is a vertical sectional view taken on the line 14—14 of Fig. 11.
Figure 15:
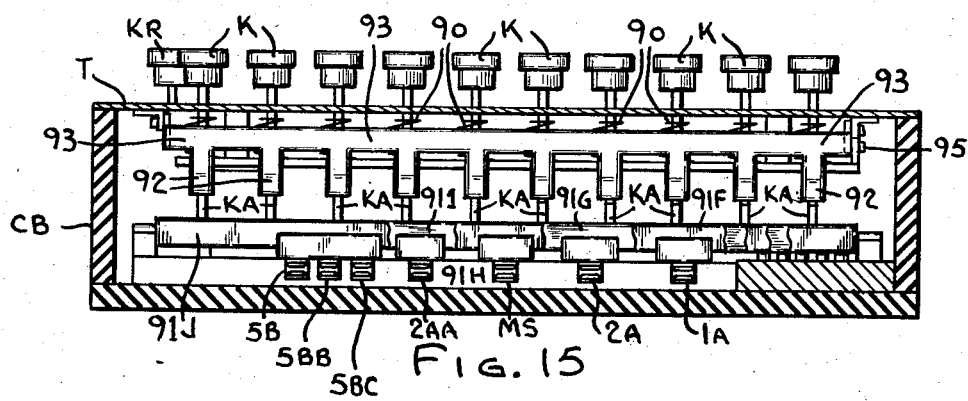
Fig. 15 is a vertical sectional view taken on the line 15—15 of Fig. 11 as viewed in the opposite direction.
Figure 16:
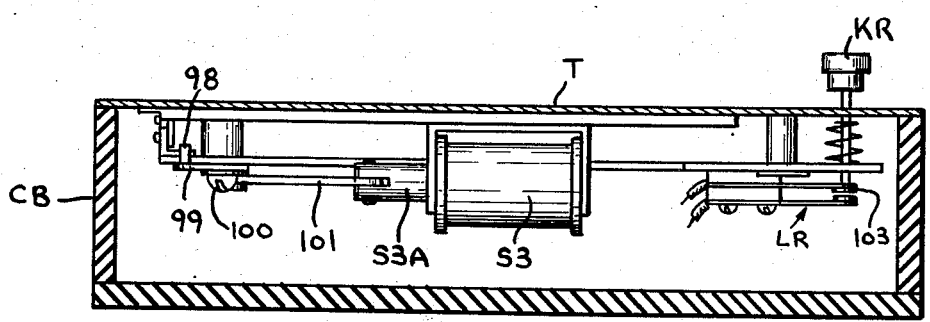
Fig. 16 is a vertical sectional view taken on the line 16—16 of Fig. 11.

There is a set of levers 91 for each row of keys as shown in Fig. 12. The first lever 91A of the first row controls a switch 50A for the S50¢ solenoid, the second lever 91B controls a switch 25A for the S25¢ solenoid, the third lever 91C controls a switch 10A for the S10¢ solenoid, and another switch 10AA forming a part of a circuit hereinafter described, the fourth lever 91D controls a switch 10B for the solenoid SA10¢ and another switch 10BB forming a part of a circuit hereinafter described, and the fifth or last lever 91E for this row of keys controls a switch 5A for the solenoid S5¢ and another switch 5AA forming a part of a circuit hereinafter described.

The first lever 91F for the second row of keys controls a switch 1A for the solenoid S1¢, the second lever 91G controls a switch 2A for the solenoid S2¢, the third lever 91H controls a motor switch MS, the fourth lever 91I controls a switch 2AA for the solenoid SA2¢, and the fifth or last lever 91J for this row of keys controls three switches 5B, 5BB, and 5BC forming parts of circuits hereinafter described.

Figure 19:
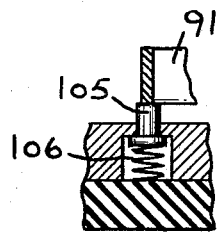
Fig. 19 is a vertical enlarged fragmentary section taken on the line 19—19 of Fig. 17.
Figure 13:
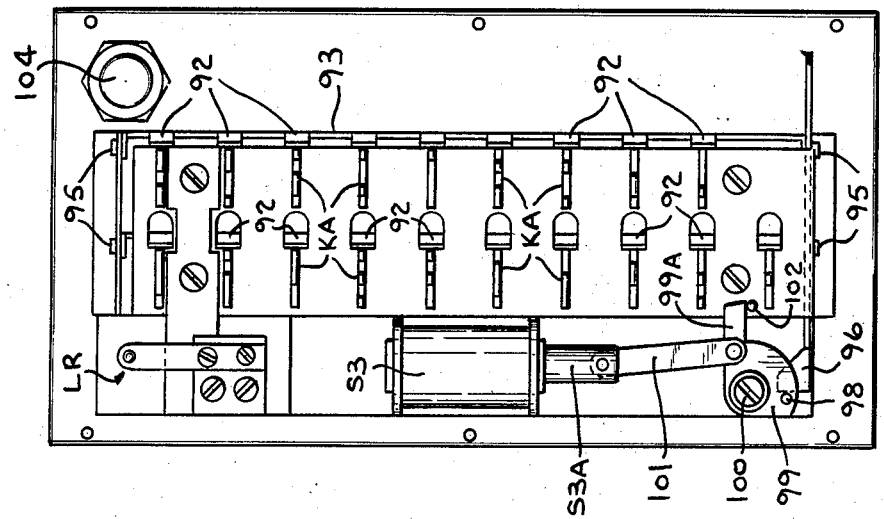
Fig. 13 is a bottom view of the top of the cover of the box.

The bars 91 (see Fig. 19) of each set are each normally urged to release position by a pin 105 urged upwardly by a spring 106.

Referring to Fig. 20, the numeral 106 designates one of the current supply lines and 107 the other. The coils of solenoids S50¢, S25¢, SA2¢, S2¢, and S1¢ with their respective control switches 50A, 25A, 2AA, 2A, and 1A are directly connected across the lines 106 and 107 by conductors 108, 109, 110, 111, and 112, respectively. A conductor 113 also across the supply lines includes the switch 10A, the switch RA4 of relay R4 and the coil of solenoid S10¢. A conductor 114 including switch 10B connects with one terminal of a switch RB4 of relay R4 whose other terminal is connected by a conductor 115 including the coil of solenoid SA10¢ with the line 107. A conductor 116 including the switch 5B connects with one terminal of a switch RA2 of relay R2 whose other terminal is connected by a conductor 117 to one terminal of a switch RA3 of relay R3 whose other terminal is connected by a conductor 118 including the coil of solenoid S5¢ with the line 107. The switch 10AA has one terminal connected with the line 106 and its other terminal connected by a conductor 119 with one terminal of the switch 10BB whose other terminal is connected by a conductor 120 with one terminal of the switch 5BC whose other terminal is connected by a conductor 121 with the line 107 and includes the coil for the relay R4. A parallel branch conductor 122 from the conductor 121 includes the coil of the relay R3. A branch conductor 109 connects through relay switch RC4 with the terminal point 124 in line 121. A branch conductor 125 from conductor 115 connects with one terminal of a switch RB2 of relay R2 which connects by conductor 126 with a conductor 127 that connects with the lines 106 and 107 and includes the coil of the relay R2 and the switches 5AA and 5BB.

A branch connector 128 from line 107 connects this line with one side of the motor M and is connected by a conductor 129 including the coil of the holding solenoid S1 with a conductor 130 which connects with one side of the relay switch RA1 and with one side of the motor switch SM. A branch connector 131 from line 106 connects this line with one of the terminals of the switch RA1. One terminal 132 of the switch SM is connected by a conductor 133 with the other side of the motor and a conductor 134, across conductors 133 and 128, includes the coil of the clutch solenoid S4. The other terminal 135 of the switch SM is connected by a conductor 136 to the line 107 and includes the coil of the key release solenoid S3. A conductor 137 between the lines 106 and 107 includes the lamp 104 and one member of the switch SL. A conductor 138 including the motor switch MS connects the line 106 with a conductor 139 which has a branch 140, connected with the line 107 and including another member of switch SL and the coil of relay R1, and a branch 141 including the lock release switch LR and the coil of the lock release solenoid S2.

With the circuit arrangements above described, if the operator presses any one of the keys in the second row of keys shown in Fig. 10 down from 1 to 9, the corresponding amount in cents will be dispensed by the machine. When any one of the keys 1 to 9 in this row is depressed, it moves the lever 91H to actuate the motor switch MS, which lever may also be actuated by the zero key. When the key numbered 1 of this second row is depressed, lever 91F is depressed to close switch 1A and current flows from the line 106 through switch 1A, conductor 112, the coil of solenoid S1¢ to the line 107 so that the plunger SA1¢ of this solenoid picks up the push bar 33 for the ejector mechanism of the chute for the one pennny chute and then current flows through the switch MS, conductor 138, conductor 139, lower member of switch SL, conductor 140, coil of relay R1 to the line 107. This causes the coil of relay R1 to shift the switch member RA1 so as to connect the line 131 with the line 130 and the switch SM to terminal 132 and conductor 133 so that current passes to the motor and returns to the line 107 through the conductor 128 so that the motor then acts in the manner previously described to turn the shaft 56 and then through the disks 55 and rods 54 cause the bar 52 to move toward the left as shown in Fig. 3, picking up the push bar 33 for the 1¢ chute and swinging the lever 29 for the ejector finger 27 of this chute to discharge a penny. The rotation of the motor alone does not cause the shaft 56 to rotate, but since the clutch "throw in" solenoid S4 is also then across the line 134, it will be energized to throw in the clutch.

When the number 2 key in the second row is depressed, the lever 91G is depressed to close switch 2A, and the action is the same as in depressing the number 1 key except that then current flows through the conductor 111 and the coil of the solenoid S2¢ so that it can pull up its associated push bar 33 so that when the motor M operates and through the mechanism above described actuates the ejector lever 29 and finger 27 for the first 2¢ chute, two pennies will be delivered from this chute.

Depressing of the number 3 key acts to depress the levers 91F and 91I to operate the switch 2AA and the switch 1A so that the solenoids SA2¢ and S1¢ are energized through passage of the current from line 106 through conductors, respectively, 110 and 112 to the line 107 to bring up the push rods 33 for the ejector mechanisms for the 1¢ and the second of the 2¢ chutes and then similar to the pressing down of the one cent key the motor is operated and acts as above described to actuate the push bars 33 for these respective chutes so that 3¢ is delivered.

When the 4 button is depressed, the levers 91G and 91I are operated so that both of the switches 2AA and 2A will be operated, thereby energizing the coils of the solenoids SA2¢ and S2¢ through passage of current 106 through conductors, respectively, 110 and 111 to the line 107 and at the same time since the motor switch MS has been operated by the same key, the motor M is actuated as previously described to move the then properly adjusted push bars 33 for these two chutes so that 2¢ each will be delivered from each chute.

Depressing the number 5 key operates the lever 91J which closes the switch 5B so that current then flows from the line 106 through the conductor 116 and the then closed switch RA2 of the relay 2 to the conductor 117 to the then closed switch RA3 of relay R3 to the conductor 118 including the coil for the solenoid S5¢, thereby placing the push bar 33 for the 5¢ coin chute in an operative position, and since the motor switch MS is simultaneously operated by the pressing down of this key, the motor M operates as previously described to effect the movement of this push bar 33 to deliver a nickel. At the same time switches 5BB and 5BC are operated, but since other parts of the conductors containing these switches are open, their closing has no effect.

When the key 6 is operated, it will act to depress the levers 91J and 91F to close the 5B switch and the 1A switch, the circuits being the same as previously described in connection with the 1A or penny delivery circuit and the 5B or 5¢ delivery circuit so that 6¢ will be delivered.

When the number 7 button is depressed, the levers 91J and 91G are operated to close the switches 5B and 2A, thus energizing solenoids S5¢ and S2¢ so that the motor may act through the mechanism above described to dispense 7¢, 2¢ from the first 2¢ chute and 5¢ from the 5¢ chute.

When the key 8 is depressed, the levers 91I, 91J, and 91F are operated to close the switches 5B, 2AA, and 1A, thereby energizing the solenoids S5¢, SA2¢, and S1¢ so as to set the ejector mechanisms so that 5¢ will be delivered from the 5¢ chute, 1¢ from the 1¢ chute and 2¢ from the second of the 2 penny chutes.

When the key 9 is depressed, the levers 91J, 91I, and 91G will operate to close switches 5B, 2AA, and 2A, thus energizing the solenoids S5¢, SA2¢, S2¢ so that 2¢ will be delivered from each of the 2¢ chutes and 5¢ from the 5¢ chute for the 9¢ amount.

For paying 10¢ the zero key of the second row and the number 1 key of the first row are depressed, the one key in the first row being depressed first. This acts to depress the levers 91D and 91H to close the switch 10B and the switch MS and current then flows from the line 106 through conductor 114, relay switch RB4, conductor 115, through the coil of the solenoid SA10¢ to the line 107 setting the push bar 33 for the 10¢ chute next to the 25¢ chute as shown in Fig. 1, and then when the zero button of the second row is depressed to close the switch MS, the motor S is operated as previously described so as to actuate the push bar and its associated mechanism to deliver the single 10¢ piece from this chute. While the switch 10BB is also closed, since the other parts of the conductor containing this switch is open, its closing has no effect.

From 11¢ to 19¢ the operation is identical as for the 10¢, the only difference being that instead of pressing the zero key, the operator presses one of the keys 1 to 9 in the second row for the amount desired to be dispensed, and we have seen in taking up each one of the keys of the second row individually that they will dispense an additional amount to 9¢ to make up the amount desired.

For dispensing 20¢ the operator presses down on the number 2 key of the first row and in doing so operates the bars 91C and 91D to close switches 10A and 10B. The closing of the switch 10A causes current to flow from the line 106 through the conductor 113 including switch RA4 of relay R4 and the coil of the solenoid S10¢ so that the pusher bar 33 for the 10¢ key nearest the quarter chute is pressed in operative position and at the same time the switch 10B is closed so that current flows through the line 114 to the line 107 and including the coil SA10¢ for setting the pusher bar of this 10¢ chute, to wit: the one next to the 5¢ chute, so that when the zero key of the second row is depressed and the motor switch MS operated, the parts will function as previously described to eject coins from each of the 10¢ chutes, the switches 10AA and 10BB while closed having no effect since the switch 5BC is open.

For 21¢ to 24¢ the operation is the same except instead of pressing the zero key the keys 1 to 4 of the second column are depressed depending upon the amount desired.

For dispensing 25¢ the operator presses down on the number 2 key of the first row to close switches 10A, 10AA, and 10B, 10BB, and as has been described in connection with the 20¢ operation the solenoids S10¢ and SA10¢ will be energized, but when the operator presses down the number 5 key of the second row to close switch 5BC, current then flows from conductor 106, switch 10AA, conductor 119, switch 10BB, conductor 120, switch 5BC, conductor 121 and 122, thereby energizing the coils of relays R4 and R3 so that switches RA4 and RB4 are cut out, switch RC4 is connected with conductor 123, and switch RA3 is cut out so that the current from line 121 passes through conductor 123 and the coil of solenoid S25¢ to the line 107 and the pusher bar for the 25¢ is set and the motor switch MS is closed as previously described so that the motor circuit will be established as previously described to eject 25¢ from the 25¢ chute.

For 26¢ to 29¢, the operation is the same as that for 25¢ except that after pressing the number 2 key of the first row, the digit keys 6, 7, 8, and 9 are pressed depending upon the pennies added corresponding to the amount desired.

For dispensing thirty cents the number 3 tens key is depressed moving levers 91B and 91E to close switches 25A, 5A, and 5AA. Closing of switch 25A establishes current flow from 106 through conductor 109 through the coil of solenoid S25¢ to lift up the pusher bar 33 for the 25¢ solenoid, and closure of the switch 5A establishes, as we have seen previously, current flow through the conductor including switch 5A to conductor 116, relay switch RA2, conductor 117, relay switch RA3, conductor 118 through the coil of the solenoid S5¢ to lift up the 5¢ ejector push bar and then closing of the zero key in the second row causes the motor to function as before to dispense 25¢ from the 25¢ chute and 5¢ from the 5¢ chute.

For 31¢ to 34¢, the operation is the same as that above described except that in addition to the paying out from the 25¢ and 5¢ chutes the depression of the keys 1 to 4 of the second row will cause the corresponding addition of pennies to the 30¢ to make up the amount desired.

For dispensing 35¢, the number 3 tens key is depressed, moving levers 91B and 91E to close switches 25A, 5A, and 5AA the same as in dispensing 30¢, but when the 5 key of the second row is operated, then the switches 5B, 5BB, and 5BC are closed with the result that current can now flow from the line 106 through conductor 127, switches 5AA and 5BB of the conductor 127 to energize the coil of relay R2 so that switches RA2 and RB2 are shifted causing the S5¢ solenoid to be disconnected and throwing in the solenoid SA10¢ since current can now pass through conductor 126, switch RB2, conductor 125, conductor 115 including coil of solenoid SA10¢ to the line 107.

For 36¢ to 39¢ the action is the same as for 35¢ except that in depressing the digit keys 6, 7, 8, and 9 the pennies corresponding to the additions to 35 are added to make up the amount desired.

For dispensing 40¢, depressing of the tens key 4 depresses the levers 91B, 91D, and 91E to close switches 25A, 10A, and 5A so that, as previously described, the circuits are established through the solenoids S25¢, S10¢, and S5¢, and then when the zero key of the second row is depressed to establish current flow through the motor, the push bars for the ejectors are positioned by the solenoids mentioned above to dispense 25¢ from the 25¢ chute, 10¢ from the one next to the quarter chute, and 5¢ from the nickel chute.

The dispensing of 41¢ to 44¢, respectively, is similar to the 40¢ operation except that the additional digits or pennies are added to the 40¢ by the selective operation of the keys 1 to 4, respectively.

For 45¢, the tens key 4 is depressed as before operating switches 25A, 10A, and 5A. This connects the solenoids S25¢ and S10¢ across the lines and also the solenoid S5¢, but when the digit key 5 is operated, the switches 5B, 5BB, and 5BC are closed, and the closing of the switch 5BB establishes current flow through the conductor 127 to the coil of relay R2 to shift the switch RB2 to connect conductor 126 with conductor 125 and cut out the connection of RA2 with conductor 117 so that the coil of solenoid S5¢ is deenergized and coil of solenoid SA10¢ is energized whereby 25¢ is dispensed from the 25¢ chute and 10¢ each from each of the 10¢ chutes.

For dispensing amounts from 46¢ to 49¢ the action is similar to that for 45¢ except that in depressing the digit keys 6 to 9 additional pennies are added so as to form the desired amount.

For 50¢ the tens key 5 is depressed to operate lever 91A to close the switch 50A so that current from the line 106 flows through conductor 108 and the coil of solenoid S50¢ to energize the same and set its pusher bar 33 in operative position so that when the zero key of the second row is depressed, the motor through the connections above described will operate to deliver 50¢ from the 50¢ chute.

For dispensing amounts of 51¢ to 59¢ the operation is the same as for the 50¢ except in addition to the operation of the solenoid S50¢ the S1¢, S2¢, or S5¢ solenoids previously described will be operated by the depression of the tens keys 1 to 9, as for the dispensing of 1¢ to 9¢ as previously described to which is added the dispensing of the additional 50¢ through the S50¢ solenoid.

For dispensing 60¢, the tens key 6 is depressed, which closes switch 50A and switch 10B which we have seen energizes the solenoids S50¢ and SA10¢ and then on the operation of the zero key of the second row the motor circuit is closed and the dispensing of 50¢ from the 50¢ chute and 10¢ from the 10¢ chute next to the nickel chute follows.

For dispensing 61¢ to 69¢ the same operation occurs as for the 51¢ to 59¢ except that in addition to the 50¢ and the 10¢ additional amounts of pennies or a nickel are added to make up the desired amount, it being understood that in each instance only the pennies are dispensed up to 4¢.

The dispensing of 70¢ is similar to 60¢ except that in depressing the tens key 7 both of the switches 10A and 10B are operated in addition to the switch 50A so that each of the 10¢ solenoids and the 50¢ solenoid will act as previously described when the zero key of the second row is depressed to permit the dispensing of 70¢.

Using the tens key 7 as a basis in dispensing 71¢ to 74¢ is similar to dispensing 70¢ except that instead of operating the zero key the appropriate digit key of 1 to 4 is operated to produce the desired amount.

For dispensing 75¢ the tens key 7 is depressed which acts to close the switches 50A, 10A, and 10B and then on the operation of the 5 key of the second row the switches 5B, 5BB, and 5BC are closed, and as a result and similar to the operation of the dispensing of 25¢ this acts to cut out the two 10¢ solenoids SA10¢ and S10¢ that would otherwise be energized and also to cut in the S25¢ solenoid so that in addition to the 50¢ dispensed by the energization of the solenoid S50¢ on the closing of the switch 50A, 25¢ will be dispensed from the chute controlled by the solenoid S25¢.

As before amounts from 76¢ to 79¢ are obtained by adding to the 75¢ amount the digit amounts 1 to 4 through the selective depression of the second row keys 6 to 9.

For 80¢, depressing of the tens key 8 closes the switches 50A and 25A and the switch 5A so that the solenoids S50¢, S25¢, and S5¢ are energized through circuit connections which have been previously described to deliver the respective amounts from the chutes associated with these solenoids.

For dispensing 81¢ to 85¢ the penny amounts are added to the 80¢ amount by the respective depression of the keys 1 to 4 of the second row to dispense the amount desired.

For 85¢ the 8 digit key closes switches 50A, 25A, and 5A which as before energizes the solenoids S50¢ and S25¢ and then temporarily energizes the solenoid S5¢, but this is immediately cut out when the digit key 5 of the second row is depressed closing the switch 5BB so that current from line 106 can pass through switch 5AA and 5BB, conductor 127 to the coil of relay R2 to throw the switch RB2 to connect conductor 126 with 125 and conductor 115 so as to energize the coil of solenoid SA10¢ at the same time cutting out the 5¢ solenoid so that 50¢, 25¢, and 10¢ will be dispensed from the machine.

For 86¢ to 89¢ the penny additions are made to the 85¢ dispensing in the same way as before by the addition of the additional pennies through the operation of the keys 6 to 9 of the second row to 85¢ to make up the amount desired.

For dispensing 90¢ the operator depresses the number 9 tens key to close the switches 50A, 25A, 10A, and 5A, thereby energizing the solenoids S50¢, S25¢, S10¢, and S5¢ since the circuits are then in direct connection with the coils of these solenoids so that 90¢ will be delivered by the machine when on depressing of the zero key the motor is operated.

For amounts of 91¢ to 94¢ the same action as with the 90¢ operation occurs but with the addition of additional penies through the selective operation of the tens keys 1 to 4.

For dispensing 95¢ the action is the same as the combined action as previously described for dispensing 50¢ and 45¢ and is accomplished by depressing of the 9 tens key and the 5 digit key.

For 96¢ to 99¢ the pennies to the desired amount are added to the 50¢, 25¢, and two 10¢ deliveries by pressing down on one of the keys 6 to 9 of the second or the digit row which will give the desired amount.

It is to be noted that the relay R1 provides a time delay between the time that the motor switch MS is operated by one of the keys in the digit row before the motor switch SM becomes effective to establish a flow of current to the motor M so that the pusher bars 33 are set before the motor is started, and this relay together with motor timed bell crank 70 acts to bring about the desired sequence of operations of the motor switch SM.

The above description has been given assuming that the chutes will always be full of coins, but as noted in the first part of this description, means have been provided to indicate when the coins in any one of the chutes become depleted, and this means acts in conjunction with the switch SL so that when the coins in any one chute are depleted and the finger 36 moves into the chute and the back end of the lever 39 drops down under the action of the spring 41A acting on the plunger 41, the finger 88 of the plunger 41 also acts on the bar 83 which through the link 85 and lever 86 acts to open the switch SL from its normal position shown in Fig. 20. This opens up the motor circuit since it disconnects conductor 139 and 140 and at the same time it establishes the light circuit by closing the upper member of this switch SL to complete the passage of current from the conductor 106 through the lamp 104 to the conductor 137 so that the light is lighted to advise the operator of the coin depletion. Then if the operator wishes to make one additional operation of the machine, he can, by closing the lock release switch LR, energize the lock release relay S2 which will then act to move the switch SL back to its normal position so that the motor can be again started so that when he again presses on the regular keys K, the switch SL will be in a position so that the device will operate as in the normal operation for one time.

It is also to be noted that the lever 70 acting on the spring arm 69 for each completed operation of the machine moves the switch SM so that it engages the contact 135 and thereby cuts out the motor circuit and closes the circuit through the solenoid S3 including conductor 136 so as to cause this solenoid to act through the plunger S3A, link 101, crank 99, pin 98, bar 96, to release the latches 92 of the latch bars 93 so as to permit the return of the keys K to their original position.

We desire it to be understood that this invention is not to be limited to any particular form or arrangement of parts except in so far as such limitations are included in the appended claims.

What we claim as our invention is:

1. In a coin dispensing machine, the combination of a coin tray having compartments for different denominations of coins, coin ejector mechanism for each compartment including a member shiftable from an inoperative to an operative position, an electric motor, a drive shaft, ejector operating means driven by said shaft for operating any ejector in its operative position, means operatively connecting said motor with said shaft including a shiftable clutch, solenoid operated means for engaging said clutch, a current supply circuit for said motor including a normally closed switch and a normally open relay operated switch, means for operating the relay of said normally open switch to close the same to establish current flow through said motor, a lever having latched engagement with said relay switch in its closed position and also controlling said normally closed switch, and means for releasing said lever from latched engagement with said relay switch and for moving it to a position to open said normally closed switch as said drive shaft makes a partial revolution to operate said ejector operating means.

2. In a coin dispensing machine, the combination of a coin tray having compartments for different denominations of coins, coin ejector mechanism for each compartment including a member shiftable from an inoperative to an operative position, an electric motor, a drive shaft, ejector operating means driven by said shaft for operating any ejector in its operative position, means operatively connecting said motor with said shaft including a shiftable clutch, solenoid operated means engaging said clutch, a current supply circuit for said motor including a normally closed switch and a normally open relay operated switch, means for operating the relay of said normally open switch to close the same to establish current flow through said motor, a lever having latched engagement with said relay switch in its closed position and also controlling said normally closed switch, means for releasing said lever from latched engagement with said relay switch and for moving it to a position to open said normally closed switch as said drive shaft makes a partial revolution to operate said ejector operating means, and solenoid operated latching means to hold said lever in its switch opening position until said relay operated switch is moved to its open position.

3. In a coin dispensing machine having three penny channels, a five cent channel, two ten cent channels, a quarter channel, and a half dollar channel, and an electro-responsive device for controlling the dispensing of a coin or coins from each channel, control apparatus for said devices including a keyboard having tens keys 1 to 9, digit keys 1 to 9 and zero, electrically operated means controlled by said keys for selectively rendering such of said electro-responsive devices operative to dispense from said channels the least number of coins to make up the desired amount of money to be dispensed, electrically operated means operable to dispense a coin or coins from each of the channels whose electro-responsive devices have been rendered operative, and a control circuit for said last named electrically operated means including a switch controlled by said digit keys 1 to 9 or said zero key whereby amounts from one to nine cents may be dispensed on the selected depression of the digit keys 1 to 9 and amounts of from ten cents to ninety-nine cents may be dispensed on the selected depression of said tens keys 1 to 9 and the selected depression of said digit keys 1 to 9 or said zero key.

4. In a coin dispensing machine, the combination of a coin tray having compartments for different denominations of coins, coin ejector mechanism for each compartment having an operative and inoperative condition, a solenoid operatively connected to each ejector mechanism to establish its operative condition, operating means common to all of said ejector mechanisms, electrical circuits including a source of current for energizing said solenoids, key controlled switches in said circuits and relay controlled switches in some of said circuits controlled by certain of said key controlled switches for selectively establishing said circuits to establish the operative conditions of those ejector mechanisms which when operated will dispense the least number of coins of the denominations of coins to make up the desired amount of money to be dispensed.

5. A keyboard for controlling an electrically operated and controlled coin dispensing apparatus having coin channels for pennies, a nickel, two dimes, a quarter, and a half dollar, comprising in combination, a series of circuit control switches, a row of tens keys 1 to 9, a row of digit keys 1 to 9 and zero, a series of rockers selectively operable by said tens keys to selectively operate certain of said switches, and a series of rockers selectively operable by said digit keys to selectively operate certain of said switches.

References Cited in the file of this patent

UNITED STATES PATENTS

| | | |
|---|---|---|
| 1,007,167 | Wickline | Oct. 31, 1911 |
| 1,344,786 | Bachardy et al. | June 29, 1920 |
| 1,356,379 | McDermott | Oct. 19, 1920 |
| 1,390,587 | Rohwer | Sept. 13, 1921 |
| 1,631,326 | Nordlund | June 7, 1927 |
| 2,249,236 | Tratsch | July 15, 1941 |
| 2,360,241 | Kuhl | Oct. 10, 1944 |
| 2,406,948 | Hoffman et al. | Sept. 3, 1946 |
| 2,543,899 | Dickinson | Mar. 6, 1951 |
| 2,571,596 | Meredith et al. | Oct. 16, 1951 |
| 2,581,218 | Thompson | Jan. 1, 1952 |
| 2,605,774 | Damon | Aug. 5, 1952 |
| 2,675,006 | Buchholz | Apr. 13, 1954 |

FOREIGN PATENTS

| | | |
|---|---|---|
| 83,920 | Norway | 1954 |
| 472,542 | Italy | 1952 |

UNITED STATES PATENT OFFICE
CERTIFICATE OF CORRECTION

Patent No. 2,864,385            December 16, 1958

Arnold R. Buchholz et al

It is hereby certified that error appears in the printed specification of the above numbered patent requiring correction and that the said Letters Patent should read as corrected below.

Column 5, lines 60 and 61 should read as follows instead of as in the patent:

-- A branch conductor 123 from conductor 109 connects through relay switch RC4 with the --.

Signed and sealed this 2nd day of June 1959.

(SEAL)
Attest:

KARL H. AXLINE
Attesting Officer

ROBERT C. WATSON
Commissioner of Patents